(12) United States Patent
Hahn et al.

(10) Patent No.: US 6,994,810 B2
(45) Date of Patent: Feb. 7, 2006

(54) MULTI-SHOT INJECTION MOLDING ARRANGEMENT

(75) Inventors: John J. Hahn, Hartford, WI (US); Steven P. Kolander, West Allis, WI (US); Mark G. Sellers, Hartland, WI (US); Michael E. Ebenhoe, Menomonee Falls, WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 264 days.

(21) Appl. No.: 10/076,758

(22) Filed: Feb. 14, 2002

(65) Prior Publication Data

US 2002/0102320 A1 Aug. 1, 2002

Related U.S. Application Data

(63) Continuation-in-part of application No. 09/543,805, filed on Apr. 6, 2000, now Pat. No. 6,352,427.

(51) Int. Cl.
*B29C 45/07* (2006.01)
(52) U.S. Cl. .................. 264/40.1; 264/245; 264/328.8; 425/190

(58) Field of Classification Search .............. 264/40.1, 264/40.5, 40.7, 245, 255, 328.8; 425/190, 425/192 R
See application file for complete search history.

(56) References Cited

U.S. PATENT DOCUMENTS

| | | | | |
|---|---|---|---|---|
| 3,068,520 A | * | 12/1962 | Hehl | 425/190 |
| 3,596,325 A | * | 8/1971 | Hehl | 425/192 R |
| 3,817,679 A | * | 6/1974 | Ruegg | 425/192 R |
| 4,315,724 A | * | 2/1982 | Taoka et al. | 264/245 |
| 4,863,368 A | | 9/1989 | Hehl | |
| 4,976,598 A | * | 12/1990 | Hehl | 425/161 |
| 5,007,816 A | * | 4/1991 | Hehl | 264/40.1 |
| 5,183,621 A | * | 2/1993 | Yukihiro et al. | 264/328.8 |
| 5,186,954 A | * | 2/1993 | Miyahara et al. | 264/40.7 |
| 5,360,332 A | * | 11/1994 | Hehl | 264/40.1 |
| 5,443,378 A | | 8/1995 | Jaroschek et al. | |
| 5,482,454 A | * | 1/1996 | Miyahara et al. | 425/589 |
| 5,651,998 A | * | 7/1997 | Bertschi et al. | 264/255 |

* cited by examiner

*Primary Examiner*—Jill L. Heitbrink
(74) *Attorney, Agent, or Firm*—Quarles & Brady LLP

(57) ABSTRACT

An injection molding apparatus includes a fixed injection molding machine having a housing, a first injection molding unit and a mold associated therewith. A portable framework is removably attached to the platen and has at least a second injection molding unit operably aligned with the mold and cooperable with the first injection molding unit.

5 Claims, 9 Drawing Sheets

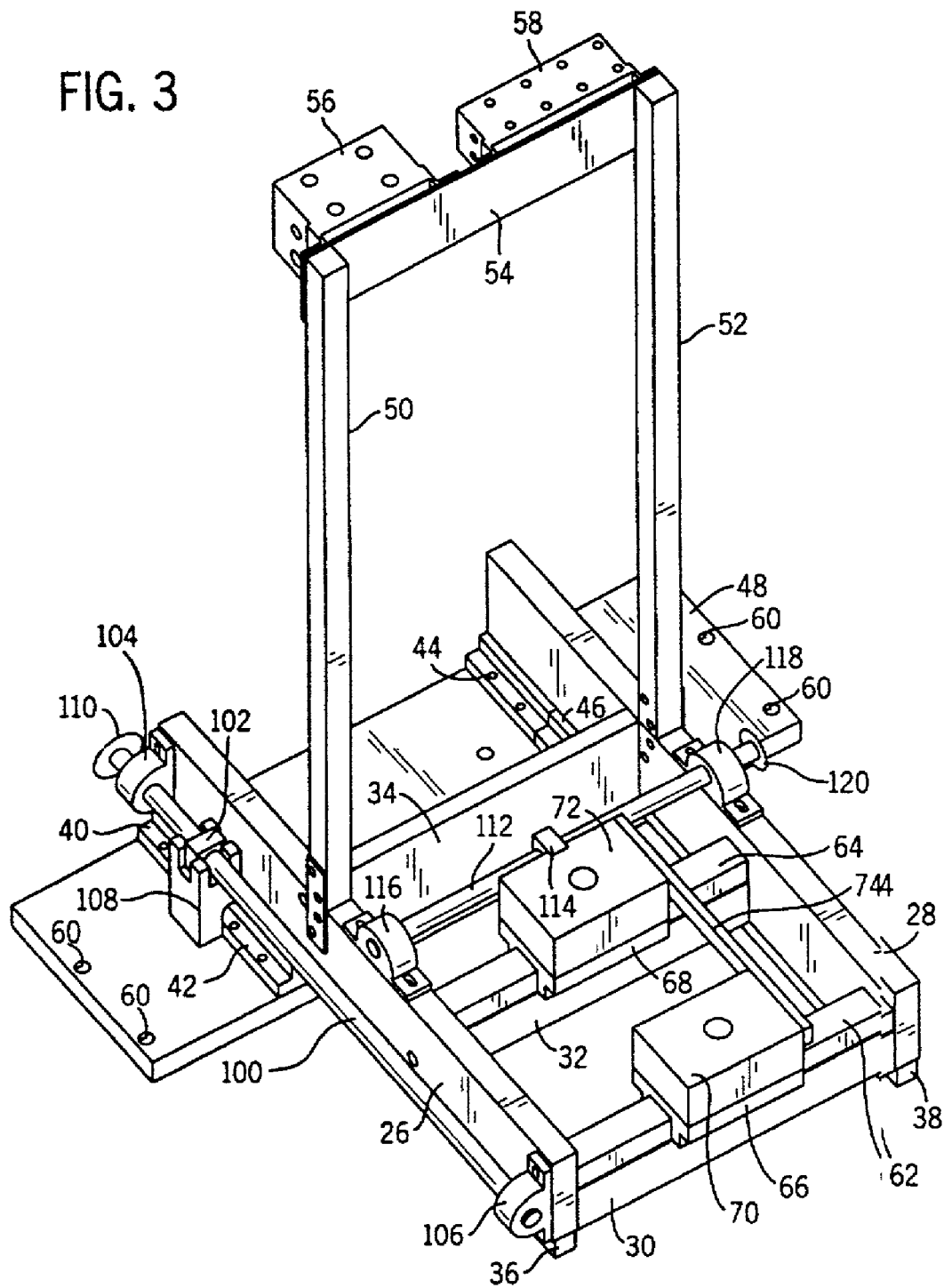

MULTI-SHOT INJECTION MOLDING ARRANGEMENT

CROSS-REFERENCE TO RELATED APPLICATIONS

This application is a continuation-in-part of U.S. application Ser. No. 09/543,805 filed Apr. 6, 2000 now U.S. Pat. No. 6,352,427.

FIELD OF THE INVENTION

This invention relates broadly to thermoplastic injection molding apparatus and, more particularly, pertains to the enhancement of a commercially available injection molding machine to increase production capability.

BACKGROUND OF THE INVENTION

Changes in plastics manufacturing strategies, particularly the growing emphasis on reducing in-process time and inventories, make multishot molding more viable and cost justifiable than single shot molding for a broader range of manufacturers. The multishot process allows multiple colors or materials to be sequentially injected in a single, continuous process to speed throughput, minimize production and assembly operations, improve part quality. and create innovative part features.

In most cases, a single injection molding machine with multiple injection units will cost less than separate machines with an equivalent number of single injection units. Likewise, a single two-color mold will usually cost less than two one-color molds. There is also a labor savings when using a multishot machine because only a single machine operator is required for the multi-step process. This can have major impact on payback calculations and life cycle costs. Floor space, electricity, and other utility costs are also reduced by consolidating operations on one machine. Faster inventory turns for savings on in-process inventory can be a critical factor in the decision matrix as well.

Despite their advantages, multishot injection molding machines are not readily available from the inventory of large press manufacturers and must often be custom built which results in several months of delay before the desired production can commence. Once the multishot machine is delivered and installed, the customer is locked into the particular arrangement of the multiple injection units on the machine. There is no interchangeability with another press manufacturer's machine or parts thereof.

Accordingly, it is desirable to provide an arrangement for removably mounting an injection molding unit on a commercially available injection molding machine in a manner which will produce all the advantages of a multishot machine without any of its drawbacks. It is also desirable to provide a flexible framework for retrofitting additional injectors onto standard injection molding machines.

SUMMARY OF THE INVENTION

It is a general object of the present invention to transform a standard single shot molding machine into a multishot molding machine.

It is one object of the present invention to provide a portable injection molding unit for expanding the flexibility of a standard injection molding machine.

It is another object of the present invention to provide a method of mounting an additional injector on a standard injection molding machine that will work with a wide variety of standard injection molding machines.

It is an additional object of one embodiment of the invention to minimize cantilever of the additional injector and material fatigue in the mounting of the injector by affixing the additional injector to the movable platen.

It is an additional object of another embodiment of the invention to accommodate large injectors by minimizing movement of the additional injector by affixing it to the stationary platen.

In one aspect of the invention, a kit is provided for converting an injection molding machine to multishot operation, where the injection molding machine has a first stationary platen holding a stationary mold portion in communication with an injection cylinder, and a second movable platen holding a movable mold portion joining with the stationary mold portion with movement of the movable platen along a closure axis, the injection cylinder, stationary platen and movable platen controlled by an injection molding controller. The kit includes a second injection cylinder having a mounting surface adapted to attach to one of the movable and stationary platens; and interface electronics providing an interface between the second injection cylinder and the injection molding controller.

In another aspect of the invention, the invention provides a method of retrofitting an injection molding machine to multishot operation, where the injection molding machine has a first stationary platen holding a stationary mold portion in communication with an injection cylinder and a second movable platen holding a movable mold portion joining with the stationary mold portion with movement of the movable platen, the injection cylinder, stationary platen and movable platen controlled by an injection molding controller. The method includes the steps of attaching a second injection cylinder to one of the movable and stationary platens; and connecting interface electronics to provide an interface between the second injection cylinder and the injection molding controller, to the injection molding controller to coordinate the operation of the second injection molding cylinder with the movement of the stationary and movable platens.

The second injection cylinder may be attached to the stationary platen and include at least one positioning actuator for moving the second injection cylinder along its axis. The interface electronics in this case allows the injection molding controller to control the positioning actuator in coordination with movement of the stationary and movable platens to engage by axial movement with the movable mold portion when the movable mold portion is joined with the stationary mold portion and to disengage by axial movement with the movable mold portion prior to separation of the movable mold portion and the stationary mold portion. The second injection molding cylinder may be attached to the top of the stationary platen or to a front surface of the stationary platen holding the stationary mold portion or to the stationary mold portion itself.

Alternatively, the second injection cylinder may be attached to the movable platen to engage with the movable mold portion and move therewith. The attachment point may be the top of the movable platen, a front surface of the movable platen holding the movable mold portion, or the movable mold portion itself.

Various other features, objects, and advantages of the invention will be made apparent from the following description taken together with the drawings.

BRIEF DESCRIPTION OF THE DRAWINGS

The invention will become better understood by reference to the following detailed description of the preferred exemplary embodiment when read in conjunction with the appended drawings, wherein like numerals denote like elements and:

FIG. 3 is a left side perspective view of the framework in the arrangement with various components removed for clarity;

DETAILED DESCRIPTION OF THE INVENTION

Figure 1:
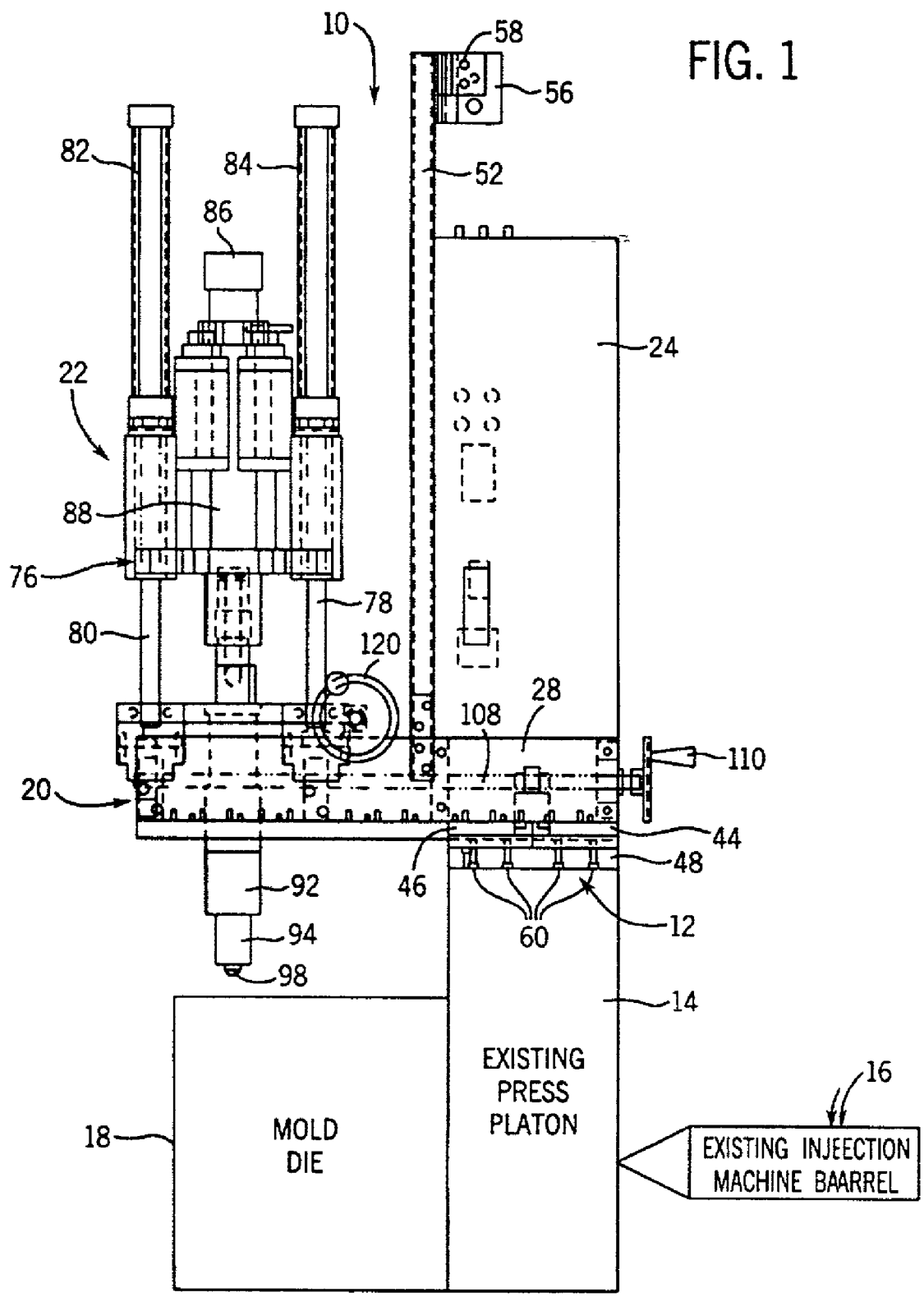
FIG. 1 is an elevational view of a portable injection molding arrangement removably mounted to an injection molding machine in accordance with the invention.
Figure 2A:
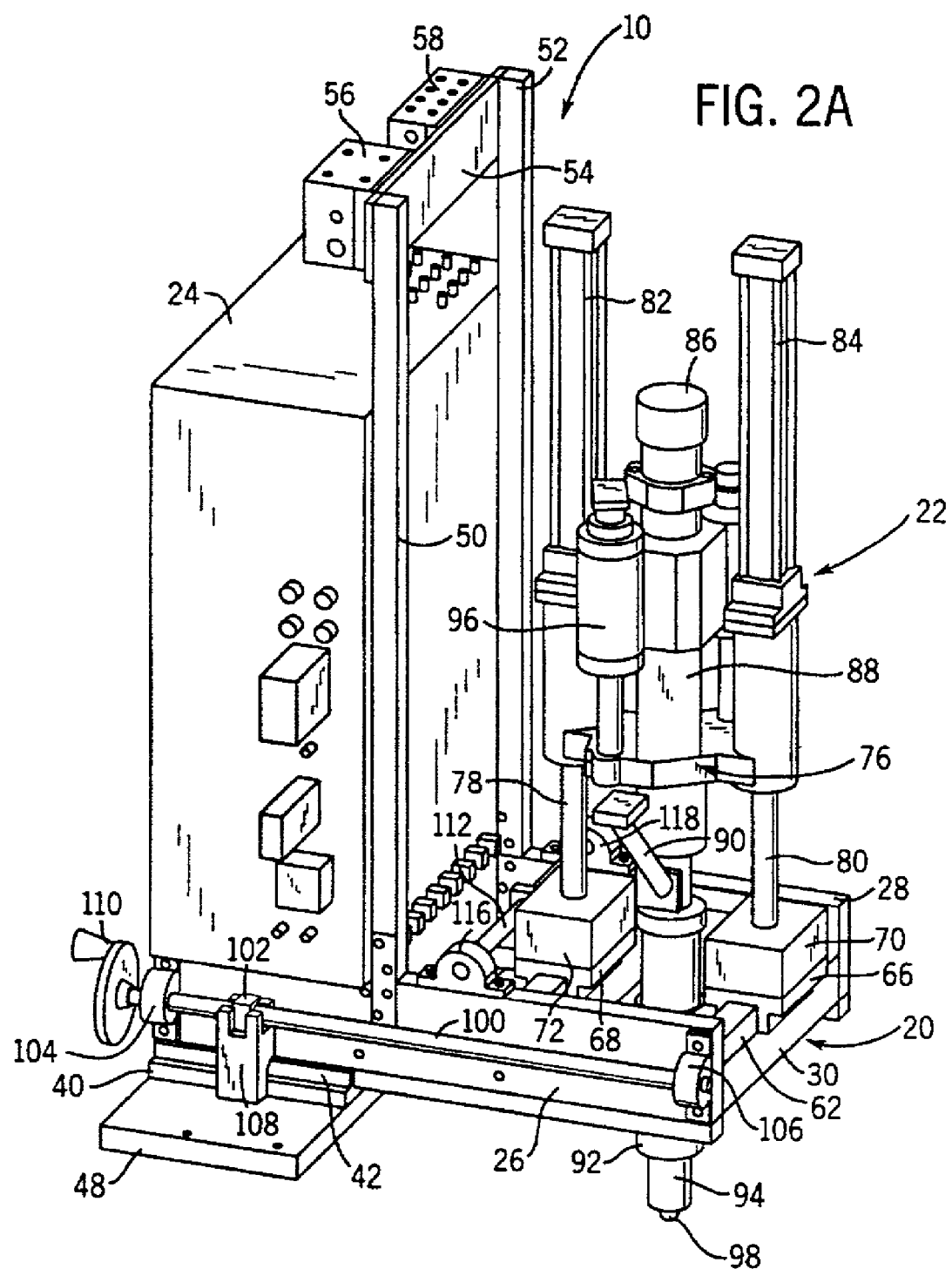
FIG. 2A is a left side perspective view of a portable injection molding arrangement removably mounted to a standard injection molding machine in accordance with the invention.
Figure 2B:
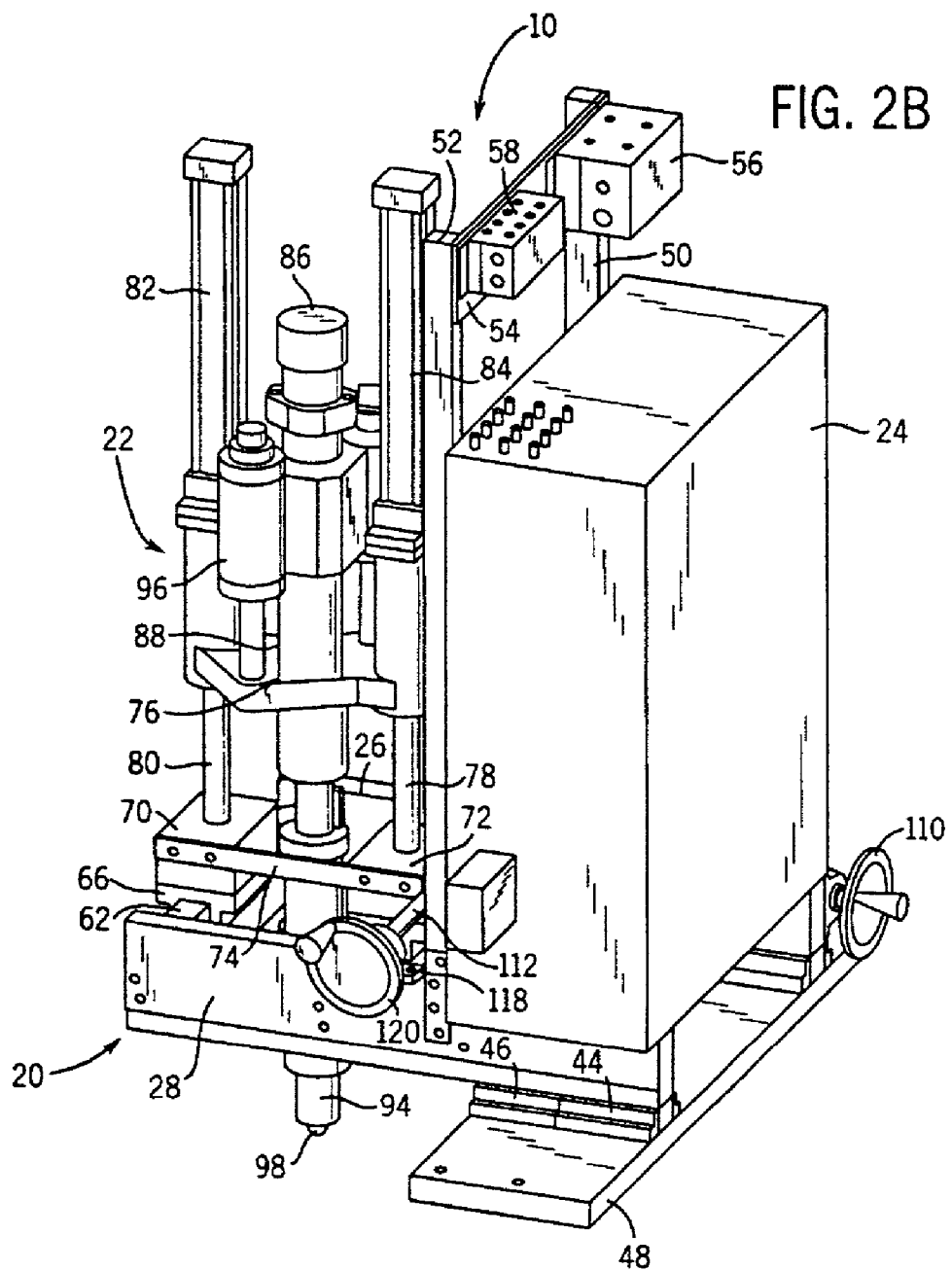
FIG. 2B is a right side perspective view of the arrangement shown in FIG. 1.

Referring now to FIGS. 1–4, a retrofit injection unit 10 is removably mounted on the platen 12 of a fixed, standard, or commercially available injection molding machine 14. As is well known, standard injection molding machine 14 includes at least one injection molding unit 16 which cooperates with a mold 18 and injects heated pellets into a mold to produce plastic products of a desired structure. Such machines equipped with one injection molding unit 16 are referred to as single shot molding machines. As explained in the background of the invention, single shot molding machines are limited in their production capability and are being upstaged by multishot machines which are usually custom-built by large press manufacturers.

The present invention converts or transforms the standard injection molding machine 14 into a two-shot or multishot machine by means of a unique mounting arrangement in a shorter period of time, and without the enormous cost and long wait of a specially manufactured machine.

Figure 4:
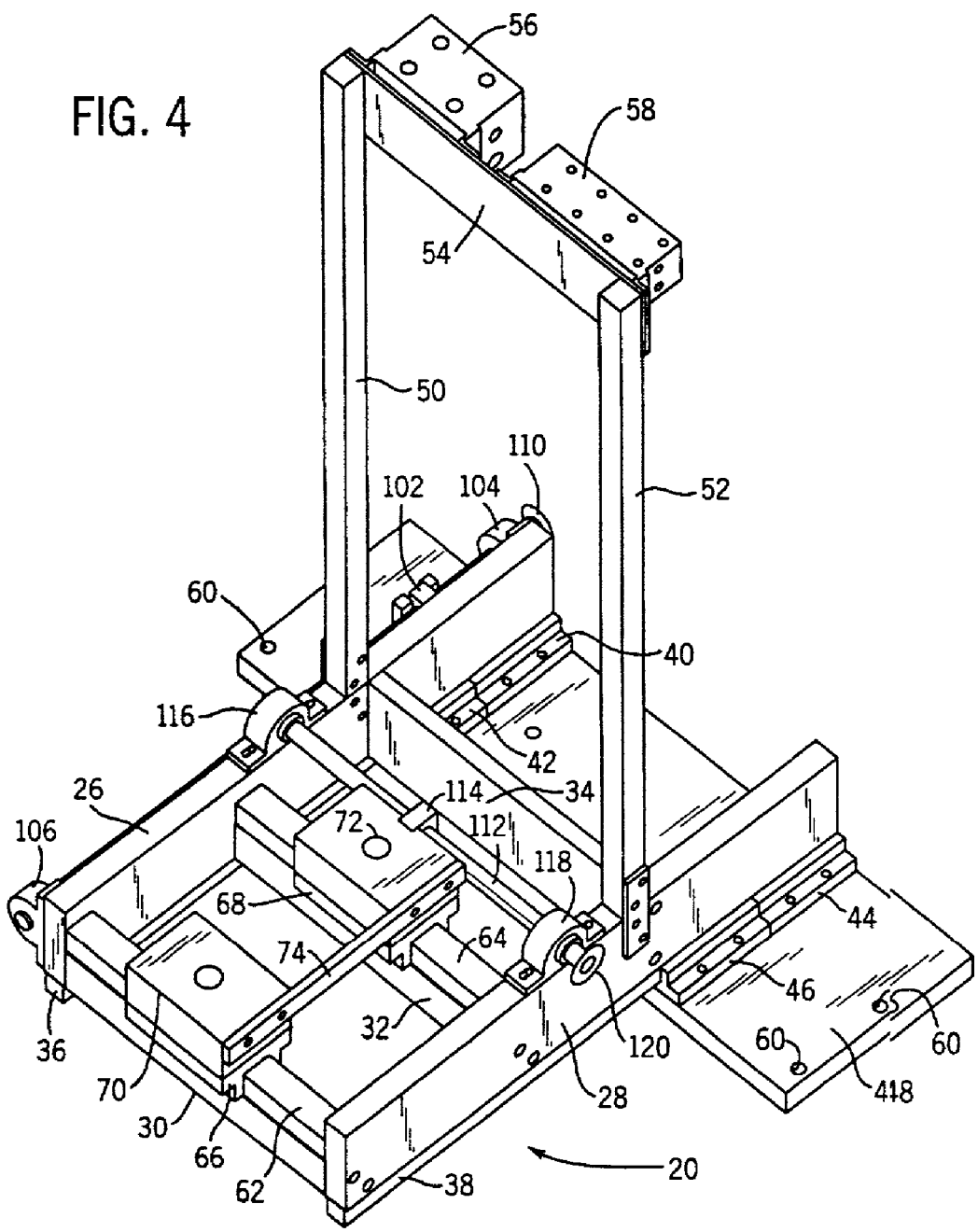
FIG. 4 is a right side perspective view of the framework shown in FIG. 3.

The retrofit injection unit 10 includes a frame 20 for adjustably supporting at least one commonly purchased injection molding unit 22 and an enclosure 24 for housing the various electrical controls therefore. As seen in FIGS. 3 and 4, frame 20 includes a pair of parallel side panels 26,28 interconnected by a front cross member 30, an intermediate cross member 32 and a transverse support wall 34. The bottom portions of the side panels 26,28 define respective longitudinal rails 36,38 which are slidably mounted in a set of four longitudinal linear bearings 40,42,44,46 anchored to a rectangular base plate 48. Extending vertically upward from the side panels 26,28 immediately adjacent the support wall 34 is a pair of parallel uprights 50,52. A cross piece 54 joins the uprights 50,52 at their upper ends and supports a pair of hydraulic manifolds 56,58 associated with the injection molding unit 22. The electrical enclosure 24 is seated on the rear portions and top edges of the side panels 26,28 and behind the uprights 50,52. It should be noted that the retrofit injection unit 10 is conveniently adapted to the standard injection molding machine 14 by removably securing the base plate 48, such as by fasteners 60, to the platen 12. It should also be appreciated that base plate 48 spans the width of the frame 20, and extends beyond the side panels 26,28 in order to provide stability to the add-on equipment.

The top portions of the front cross member 30 and intermediate cross member 32 form respective latitudinal rails 62,64 upon which a pair of respective latitudinal linear bearings 66,68 are slidably mounted. The bearings 66,68 underlie the injection molding unit 22 which includes a pair of hydraulic cylinder mounting blocks 70,72 coupled together by a tie bar 74 for a purpose to be more appreciated hereafter. The mounting blocks 70,72 support a main casting 76 movable upwardly and downwardly along respective cylinder rods 78,80 of a pair of carriage cylinders 82, 84. The casting 76 includes a hydraulic motor 86 for driving an injection screw 88 used to deliver thermoplastic pellets through a hopper feed throat 90 to the heater bands 92 of an injection barrel 94. Heated flowable plastic is periodically injected or "shot" by means of an injector cylinder 96 from a nozzle 98 which is directed to the mold 18 in the standard injection molding machine 14. This additional "shot" supplied by retrofit injection unit 10 cooperates with the shot provided by the standard injection molding machine 14 to create a multishot machine having multicolor/material molding capability with more features, better quality and less cost than when using separate single shot machines.

A salient feature of the present invention resides in the adjustability of the injection barrel 94 along three (x, y and z) axes relative to the standard injection molding machine 14. As described above, movement of the injection barrel 94 along a vertical or z-axis is provided by means of the carriage cylinders 82,84. To enable adjustment along an x-axis or longitudinally of the standard injection molding machine 14, a longitudinal lead screw 100 having a nut 102 fixed thereto is threadedly received in a pair of pillow block bearings 104, 106 joined to the side panel 26. The nut 102 is captured in a support block 108 which is connected to the side panel 26 and slides on the linear bearings 40,42. Because the side panels 26,28 are joined together, turning a handle 110 on lead screw 100 will move the side panels 26,28 and the remainder of frame 20 supporting injection barrel 94 forwardly and rearwardly in a horizontal plane parallel to the platen 12. To enable adjustment along a y-axis or laterally of the standard injection molding machine 14, a latitudinal lead screw 112 having a nut 114 fixed thereon is threadedly received in a pair of pillow block bearings 116,118 mounted on the top edges of side panels 26,28. The nut 114 is joined directly with the mounting block 72 which is slidably mounted on rail 64. Because the mounting blocks 70,72 are linked together by tie bar 74, turning of a handle 120 on lead screw 112 will cause the mounting blocks 70,72 and the injection molding unit 22 including the injection barrel 94 to traverse from side-to-side in a horizontal plane parallel to its platen 12.

When it is desired to enhance the molding capability of a standard injection molding machine 14, a crane is used to lift the retrofit injection unit 10 to a flat plane of the platen 12, and dispose the injection barrel 94 over the mold 18 of the standard injection molding machine 14. The entire frame 20 is lowered so that the base plate 48 lies flush on the platen 12, after which fasteners 60 are used to secure the base plate 48 to the housing of the standard injection molding machine 14. At this point, the various electrical, hydraulic and plastic lines are connected to the injection molding unit 22 and the enclosure 24. If necessary, the handles 110,120 are manipulated to locate the proper x and y coordinates for the injector barrel 94. Then, the cylinders 82,84 are employed to lower the barrel 94 to the proper injection location relative to the die of the standard injection molding machine 14.

Another attractive feature of the present invention is the ability of the retrofit injection unit 10 to be used on other brands of standard injection molding machine 14. By simply removing the fasteners 60 from the base plate 48, a crane can be employed to transfer the frame 20 from one standard injection molding machine 14 to another.

It should be understood that the retrofit injection unit 10 can be readily supplied to the owner of a standard injection molding machine 14 to increase the versatility of the standard injection molding machine 14. The present invention has a universal or modular design which permits the retrofit injection unit 10 to be easily installed on any standard injection molding machine 14 regardless of its particular manufacture. As a result, mold changeover is made remarkably convenient and enables the molder to meet the changing demands of customers with superior quality and high production volumes. The present invention creates valuable multishot capabilities which can be used to sequence molding and thus overmold an array of plastic components with various colors, materials, and properties for greater appearance and perceived value. In addition to consolidating several molding operations on one machine, multishot molding can be employed to eliminate assembly operations. For example, a rigid automotive housing can be molded with a soft gasket eliminating secondary handling and assembly.

Figure 5:
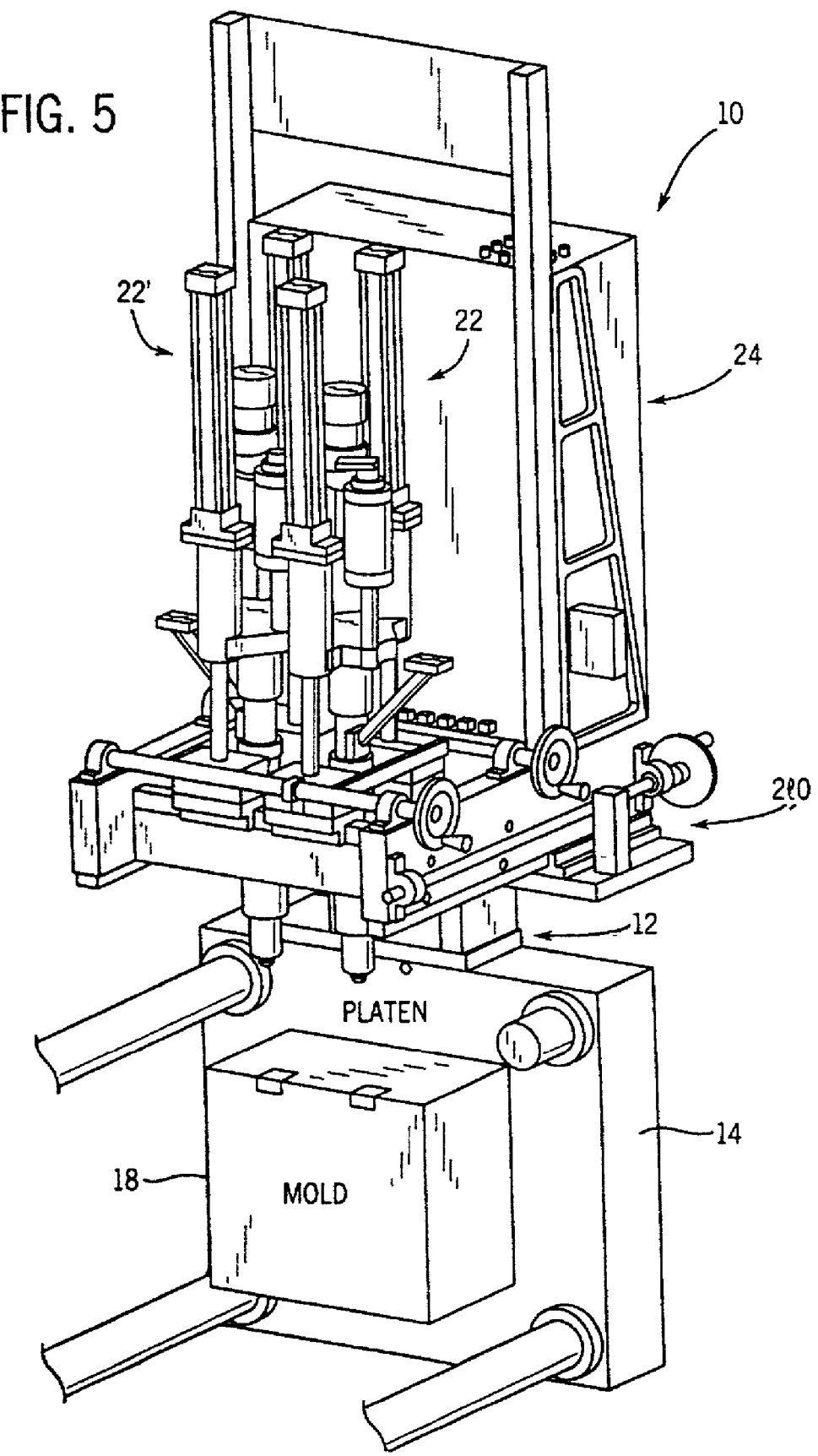
FIG. 5 is a view of a portable injection molding arrangement having two injection molding units mounted to the upper housing of the injection molding machine.
Figure 6:
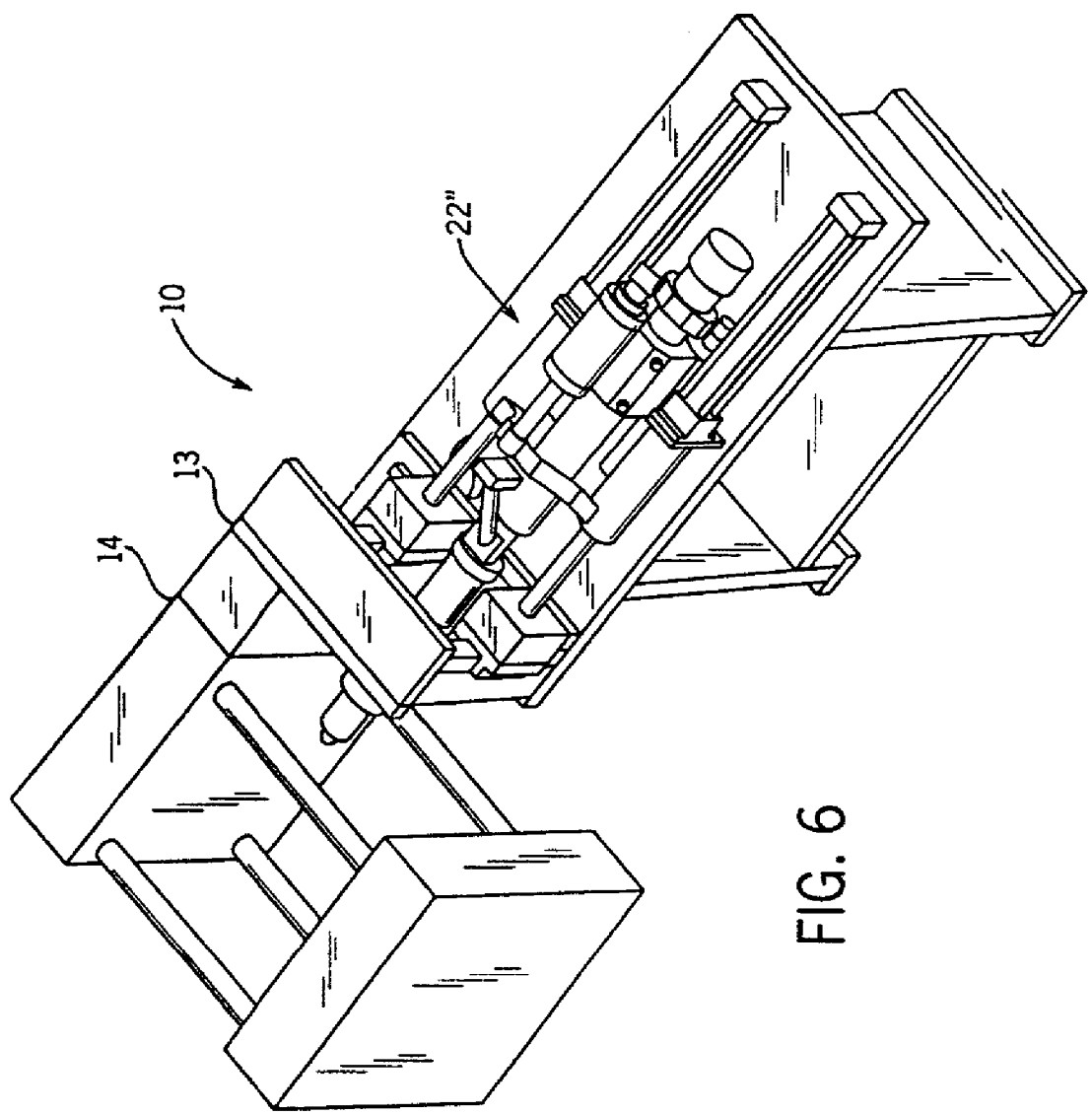
FIG. 6 is a view of a portable injection molding arrangement having an injection molding unit removably mounted to the side housing of the injection molding machine.

While the invention has been described with reference to a preferred embodiment, those skilled in the art will appreciate that certain substitutions, alterations, and omissions may be made without departing from the spirit thereof. For example, it should be understood that the invention further contemplates that a second injection molding unit 22' (FIG. 5) may be removably mounted to the platen 12 of the standard injection molding machine 14. In addition, an injection molding unit 22" can be removably mounted to another housing portion such as a side portion 13 of the standard injection molding machine 14, as shown in FIG. 6. In each adaptation, the additional injection molding unit is arranged to cooperate with the mold 18 of the standard injection molding machine 14 to increase the productivity thereof.

Figure 7:
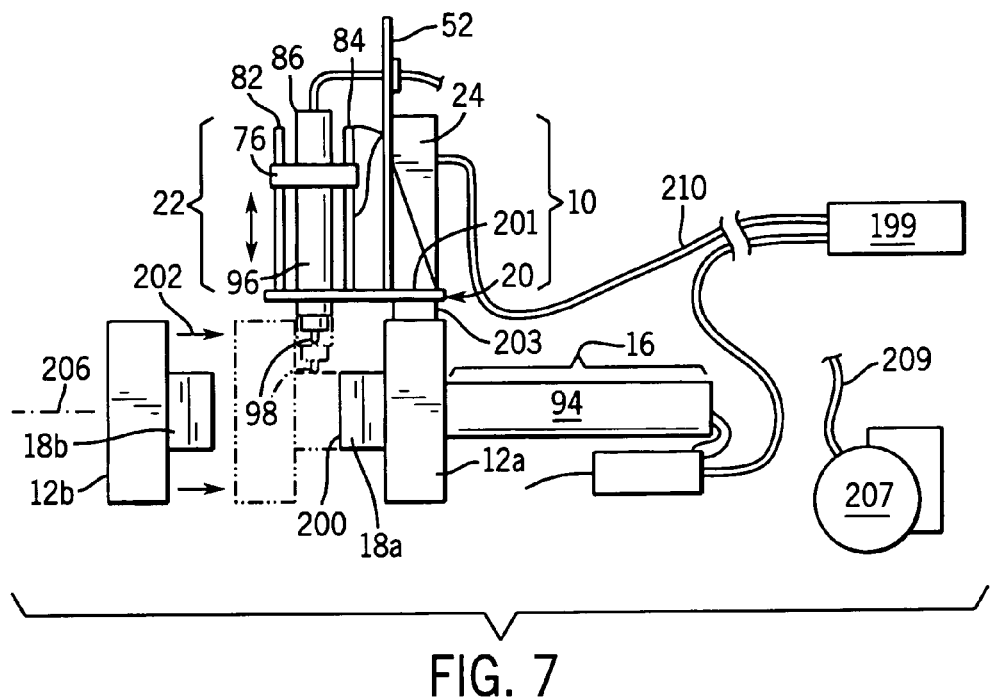
FIG. 7 is a view similar to FIG. 1 showing support of the portable injection molding arrangement on a stationary platen of the injection molding machine.

Referring now to FIG. 7, the mold 18 may include a stationary mold portion 18a and a movable mold portion 18b separable along a parting line 200 through which an injected part is removed.

The stationary mold portion 18a may be held on a stationary platen 12a and the movable mold portion 18b may be held on a movable platen 12b. As is understood in the art, the movable platen 12b opposes the stationary platen 12a and may be moved as indicated by arrows 202 toward the stationary platen 12a so as to position itself, as shown in phantom lines, so that mold portions 18b and 18a close together.

The retrofit injection unit 10 of the present invention may be advantageously mounted on the upper flat surface of the stationary platen 12a with the frame 20 positioned so as to locate the injector cylinder 96 and nozzle 98 over the movable mold portion 18b when the platens 14a and 14b are in the closed position with mold portions 18a and 18b closed.

After the mold portions 18a and 18b closed, the main casting 76 supporting the injector cylinder 96 may be moved downward (as shown in phantom line) by carriage cylinders 82 and 84 so that the nozzle 98 may be engaged with a port in mold 18b allowing injection of plastic material into the movable mold portion 18b and thus into the mold 18 generally. The hydraulic carriage cylinders 82 and 84 may alternatively be electric drives as is known in the art.

Frame 20 may be adjustable using lead screws, as taught above, or may be adjustable by other means, for example, through the use of a set of standard brackets of different sizes, or screws engaging with ones of multiple alignment holes (as will be described below) or by a machinable spacer plate or the like. Critically, the frame 20 allows control of the amount by which the injection cylinder 96 is cantilevered over the mold portions 18b and 18a.

In this case, the injector cylinder 96 is cantilevered by the distance necessary to reach over mold portion 18a to mold portion 18b. The electrical enclosure 24 and upright 52 may be positioned above the platen 12a so as to counterbalance this cantilever torque.

During each cycle of the standard injection molding machine 14, the injection cylinder must be withdrawn by carriage cylinders 82 and 84 so that the nozzle 98 may disengage from the movable mold portion 18b, prior to the movable mold portion 18b separating from the stationary mold portion 18b and the stationary platen 12a. In addition, the operation of the internal screw of the injection cylinder 96, which rotates to plasticize the injected material and fill the barrel, and moves axially to effect the injection process, must be controlled in coordination with movement of the mold portions 18.

In this regard, control signals for the hydraulic motor 86 controlling the injection screw of the injector cylinder 96 and the carriage cylinders 82 and 84 are processed by the electronic enclosure 24 which provides interface electronics and communicates standard signals known in the art over an interface cable 210 that may join with a common controller 199 of injection molding unit 16 of the standard injection molding machine 14. A program running on the common controller 199 (normally custom written for the application) coordinates the actions of the injector cylinder 96 and carriage cylinders 82 and 84 with other components of the standard injection molding machine 14.

The retrofit injection unit 10 may be readily added to any existing machine and quickly integrated into the control process.

The kit for adding the retrofit injection unit 10 may optionally include a power source 207 (pump, regulator, and accumulator) for the hydraulic motor 86 and carriage cylinders 82 and 84 (or a stabilized electrical power source for electrical drive equivalents) positioned off the frame 20 (as shown) or over platen 12a for additional compactness and to provide counterbalancing torque. The power source 207 may be connected by cable 209 with the electronic enclosure 24 and ultimately with the carriage cylinders 82 and 84 and hydraulic motor 86 associated with the injector cylinder 96.

The platen 12a forms a common location to which an additional injection molding unit 22 may be attached for most standard injection molding machines 14 without requiring modification of the underlying standard injection molding machine 14 or additional structure. While the top of the platen 12a is a convenient location, other attachment points are also possible. For example, the frame 20 may be attached to a front vertical side of the platen 12 or to the mold 18a communicating in turn with the platen 12a. Because the platen 12 is generally simple and unobstructed, to facilitate attachment of various kinds of molds and runner systems to the platens 12, the retrofit injection unit 10 can normally be attached to it with very little modification.

Attaching the frame 20 to the stationary platen 12a eliminates movement of the mass of the retrofit injection unit 10 along the closure axis 206. Thus, the mass of the retrofit injection unit 10 is of little consequence. However, a disadvantage is that the injector cylinder 96 must be raised and lowered on each cycle of the injection molding machine to allow retreat of the movable mold portion 18b from stationary mold portion 18a. This axial vertical movement of the injector cylinder 96 places repetitive stresses on the attachment of the frame 20 to the platen 12a such as may produce fatigue on those elements. In addition, removal of the injector nozzle 28 from the mold portion 18b allows excess plastic to encrust the injector nozzle 98 requiring periodic cleaning of the injector nozzle 98 and creating a chance that a molten plastic filament extending from injector nozzle 98 to the mold 18b will be drawn, with separation of mold portions 18b and 18a, across the finished part, marring or damaging it.

Figure 8:
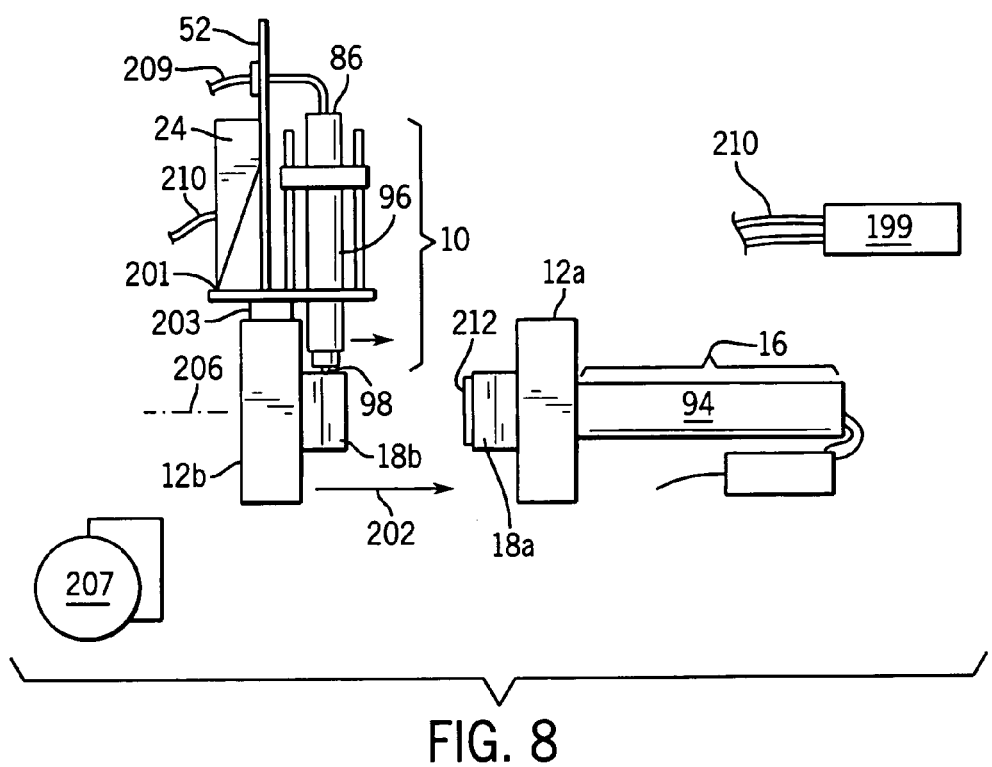
FIG. 8 is view similar to FIG. 1 showing support of the portable injection molding arrangement on a movable platen of the standard injection molding machine.

Accordingly, in an alternative embodiment shown in FIG. 8, the retrofit injection unit 10 may be affixed to the movable platen 12b to move therewith. In this case, the injector nozzle 98 may be continuously engaged with the movable portion of the mold 18b during normal cycling of the injection molding machine, reducing the encrusting of the nozzle 98 with plastic, and substantially decreasing the chance that a molten plastic filament would fall across the finished part 212 prior to the part 212 being injected from mold 18a.

Figure 9:
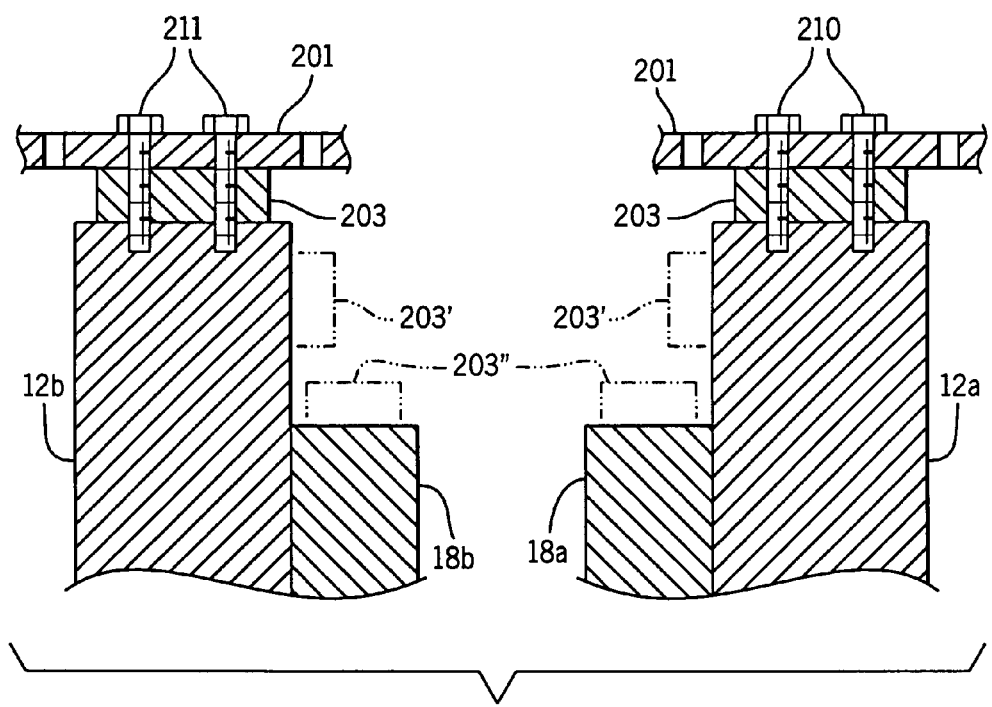
FIG. 9 is a detailed fragmentary view of the movable and stationary platens of FIGS. 8 and 9 showing variations in the mounting locations of the portable injection molding arrangement to the platens and showing an adjustment bracket for controlling the amount of cantilever in the mounting arrangement.

Referring now to FIG. 9, the frame 20 may include a mounting plate 201 having regularly spaced index holes, selected ones of which are attached to a mounting block 203 by screws 209 to control the cantilever of the injection cylinder and/or its right to left offset. The retrofit injection unit 10 may be attached to the top, or front of the platen 12b (or 12a), or directly to the mold 18b (or 18a) as indicated by blocks 203, 203' and 203", respectively. In the former cases, for mounting to the movable platen 12b, the mold 18b provides an additional point of stability between itself and the injector nozzle 98 whose continued downward force stabilizes the injector cylinder 96 and does not produce the fatigue associated with varying pressures found in the embodiment of FIG. 7. The mass of the retrofit injection unit 10 which must move along the closure axis 206 as indicated by arrows 202 with movement of the platen 12b is minimized by placement of the power source 207 off the movable platen 12b, and also by movement of other components including possibility the electronics enclosure 24 off the movable platen 12b. Again, the frame 20 may be adjustable as described above, or may be a replaceable or machinable component being part of the retrofitting kit.

The foregoing description is meant to be exemplary only, and should not be deemed limitative on the scope of the invention set forth with the following claims.

What is claimed is:

1. A method of retrofitting an injection molding machine to multishot operation, where the injection molding machine has a first stationary platen holding a stationary mold portion in communication with an injection cylinder and a second movable platen holding a movable mold portion joining with the stationary mold portion with movement of the movable platen, the injection cylinder, stationary platen and movable platen controlled by an injection molding controller, the method comprising the steps of:
   (a) attaching a mounting directly to one of the movable and stationary platens; and
   (b) adjustably attaching a second injection cylinder to the mounting;
   (c) connecting interface electronics providing an interface between the second injection cylinder and the injection molding controller to the injection molding controller to coordinate the operation of the second injection molding cylinder with the movement of the stationary and movable platens;
   wherein the second injection cylinder is attached to the movable platen to engage with the movable mold portion.

2. The method of claim 1 wherein the second injection cylinder includes at least one positioning actuator for moving the second injection cylinder along its axis and wherein the interface electronics allows the injection molding controller to control the positioning actuator in coordination with movement of the stationary and movable platens to engage by axial movement with the movable mold portion when the movable mold portion is joined with the stationary mold portion and to disengage by axial movement with the movable mold portion prior to separation of the movable mold portion and the stationary mold portion.

3. The method of claim 1 wherein the second injection molding cylinder is attached to the top of the movable platen.

4. The method of claim 1 wherein the second injection molding cylinder is attached a front surface of the movable platen holding the movable mold portion.

5. The method of claim 1 wherein the second injection molding cylinder is attached to the movable mold portion.

* * * * *